United States Patent
Cottrell

[11] 3,754,660
[45] Aug. 28, 1973

[54] APPARATUS FOR EXTRACTING FLUID FROM PULP

[76] Inventor: Herbert Cottrell, Box 240, R.D. 1, Matawan, N.J.

[22] Filed: July 28, 1971

[21] Appl. No.: 166,759

[52] U.S. Cl. .................................. 210/374, 210/397
[51] Int. Cl. ............................................. B01d 33/06
[58] Field of Search .................... 210/369, 374, 397; 209/270

[56] References Cited
UNITED STATES PATENTS

| | | |
|---|---|---|
| 569,677 | 10/1896 | Snider .................................. 210/374 |
| 605,087 | 6/1898 | Davidsen ........................ 210/374 X |
| 3,494,472 | 2/1970 | Quetsch .............................. 210/374 |
| 3,282,497 | 11/1966 | Schmiedel ....................... 210/374 X |
| 1,756,194 | 4/1930 | Haug ............................... 210/374 X |

Primary Examiner—John Adee
Attorney—Robert K. Youtie

[57] ABSTRACT

A fluid extracting apparatus including a rotary drum having a circumferential filter element for centrifugally passing fluid while retaining pulp, and rotary blade means in the drum for conveying pulp toward an outlet at a predetermined rate, to control the fluid content of the pulp.

2 Claims, 3 Drawing Figures

Patented Aug. 28, 1973

INVENTOR.
HERBERT COTTRELL

BY Robert K. Youtie
ATTORNEY.

INVENTOR.
HERBERT COTTRELL
BY
Robert K. Youtie
ATTORNEY.

APPARATUS FOR EXTRACTING FLUID FROM PULP

BACKGROUND OF THE INVENTION

While the device of the present invention has been primarily developed for use in the extraction of fruit juice from the pulp of the fruit, and will be illustrated and described hereinafter with particular reference thereto, it is appreciated that the instant apparatus is well suited for extracting a wide variety of fluids from their pulps, all of which applications are intended to be comprehended herein.

In the extraction of fruit juices, it has heretofore been conventional procedure to employ considerable manual labor in the placement of fruit in a press, afterwhich the press is closed to squeeze the fruit, such that a substantial part of the fruit juice or fluid is collected separately from the pulp, which process is extremely slow and inefficient, requiring considerable expense for labor and waste.

SUMMARY OF THE INVENTION

It is, therefore, an important object of the present invention to provide an apparatus for extracting fluid from pulp which overcomes the above mentioned difficulties, is continuous in operation, rather than a batch process, is easily and accurately controlled to obtain a desired percentage of fluid, automatically separates and collects the fluid and remaining pulp, and which considerably reduces the labor costs without excessive capital expenditure.

It is still another object of the present invention to provide a fluid extracting apparatus having the advantageous characteristics mentioned in the preceding paragraph, which is extremely simple in structure, relatively economical to manufacture, install and maintain, and which is inherently reliable for long continued usage with minimal down-time.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENT

Figure 1:
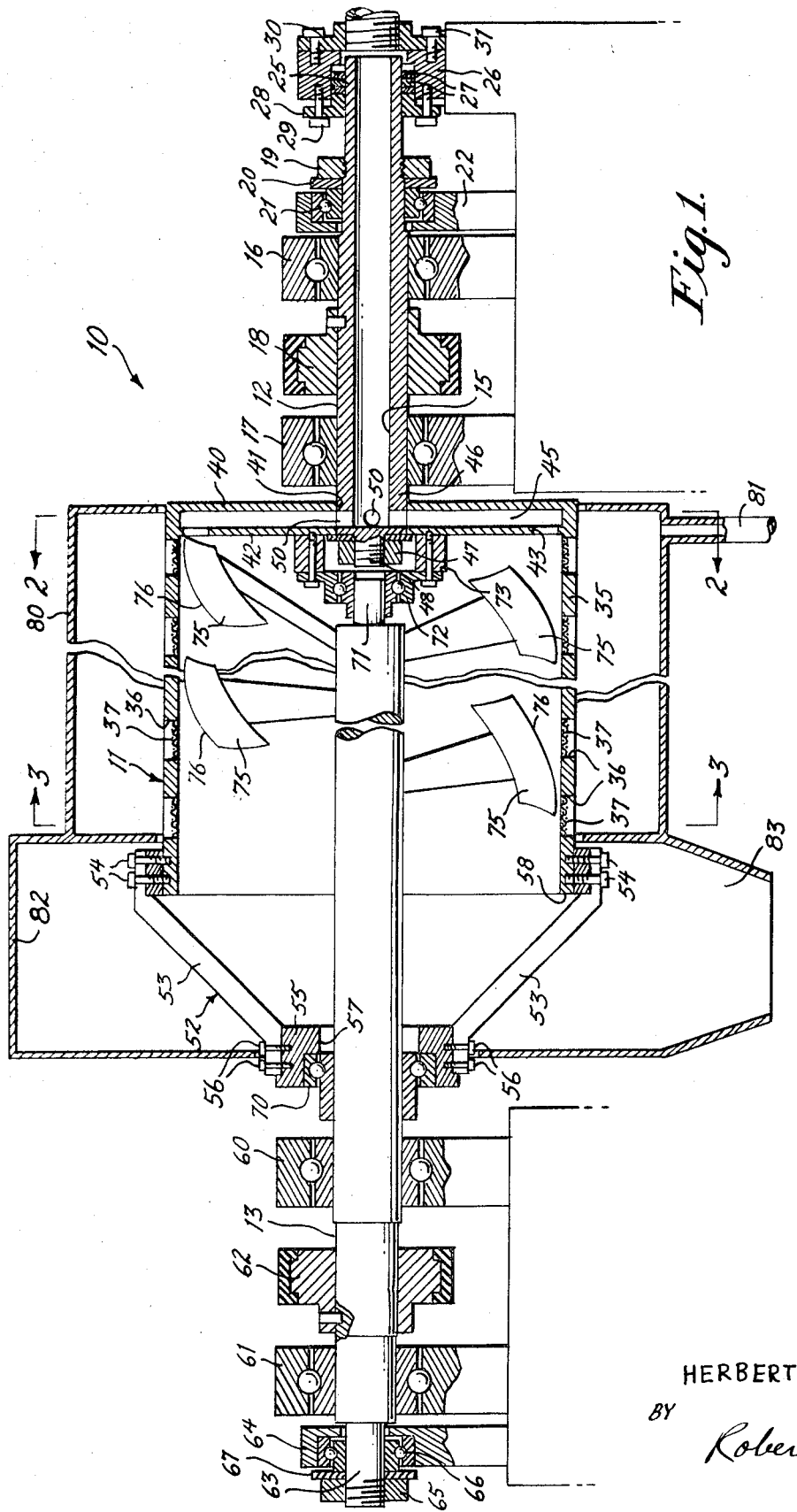
FIG. 1 is a longitudinal elevational view, partly in section and partly broken away, illustrating the apparatus of the present invention in an operative condition of use.

Referring now more particularly to the drawings, and specifically to FIG. 1 thereof, the apparatus of the present invention is there generally designated 10, and includes a drum 11 disposed generally horizontally and having extending coaxially from one end a shaft 12, while an additional shaft 13 extends coaxially from the other end of the drum.

More specifically, the shaft 12 is advantageously centrally hollow or tubular, having an interior passageway 15 opening at opposite ends of the shaft, and the shaft may extend generally horizontally, being rotatably supported by one or more pillow blocks or pedestal bearings 16 and 17. Interposed between the journal bearing 16 and 17 may be a transmission element 18, such as a pulley or toothed wheel in driven relation with a timing belt.

An annular member or collar 19 may be fixed about the shaft 12, exteriorly thereof, for engagement with a rotary abutment 20, circumposed about the shaft and rotatably carried, as by bearing means 21, on an upstanding support 22. The abutment member or collar 19 is thus engageable with the abutment member 20 to permit rotation of shaft 12 while limiting shaft movement in one direction, the leftward direction as seen in FIG. 1.

The rightward end region 25 of the shaft 12 may be rotatably received in a stuffing box 26, within which may be packing 27 circumposed about the shaft and retained in position by an annular compressor member or gland 28 suitably adjustable relative to the stuffing box, as by threaded fasteners or bolts 29. The packing 27 and gland 28 serve to effectively seal the stuffing box 26 on the left side thereof, as seen in FIG. 1. On the right side of the stuffing box 26 may be provided an internally threaded, flanged coupling 30, suitably fixed to the stuffing box, as by fasteners 31, so that the coupling 30 may receive an externally threaded pipe adapted to discharge pulp into the end region 25 of tubular shaft 12.

The centrifugal spinner or axially rotatable drum 11 may include a generally cylindrical circumferential wall 35 coaxial with the shaft 12. The cylindrical circumferential wall 35 is formed at a plurality of spaced locations with through openings or holes 36, across which holes extend reticulate material, perforate sheeting or screening, as at 37. If desired, the perforate sheeting or reticulate material 37, which defines a filter element as will appear presently, may extend about the entire interior of the cylindrical drum wall 35, if desired; or, the cylindrical drum wall 35 may, itself, be of reticulate formation, it being only necessary that the cylindrical wall be provided with suitable filtering characteristics to achieve the desired centrifugal filtering action.

One end of the drum 11 is closed, as by a generally circular end wall 40 suitably fixed, as by welding or otherwise, to and extending across one end of the circumferential wall 35, the right-hand end as seen in the drawing. The end wall 40 is provided with a central inlet opening 41 receiving the adjacent end of shaft 12, as will appear presently.

Spaced slightly inward from the end wall 40 may be an inner end wall 42, also suitably fixed to the circumferential wall 35, and formed with a plurality of through openings or holes 43 located in angulately spaced relation with respect to each other at circumferentially spaced locations adjacent to the circumferential wall 35. While four of the openings 43 are shown in the illustrated embodiment, see FIGS. 2 and 3, it is appreciated that a greater or lesser number may be employed, if desired. Extending radially along the space between the outer and inner drum end walls 40 and 42, inwardly from each opening 43, are a pair of spaced partitions or walls 44, each pair combining with the outer and inner end walls to define a radial passageway 45.

The hollow or tubular shaft 12 has its end region 46 adjacent to the drum 11 extending coaxially inwardly of the drum through outer wall 40 and inner wall 42, being suitably fixed to the drum, as by a clamping fastener or nut 47 threaded onto a reduced threaded shaft extension 48. Of course, any suitable means may be employed to rigidly secure the end region 46 of shaft 12 in coaxial alignment with the adjacent end of drum 11.

Figure 2:
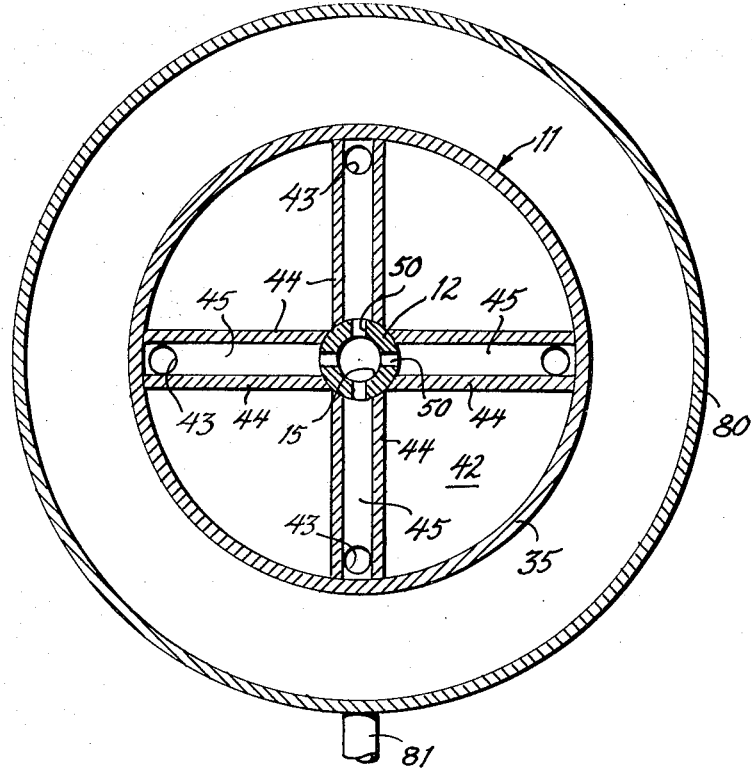
FIG. 2 is a transverse cross-sectional view taken generally along the line 2—2 of FIG. 1.
Figure 3:
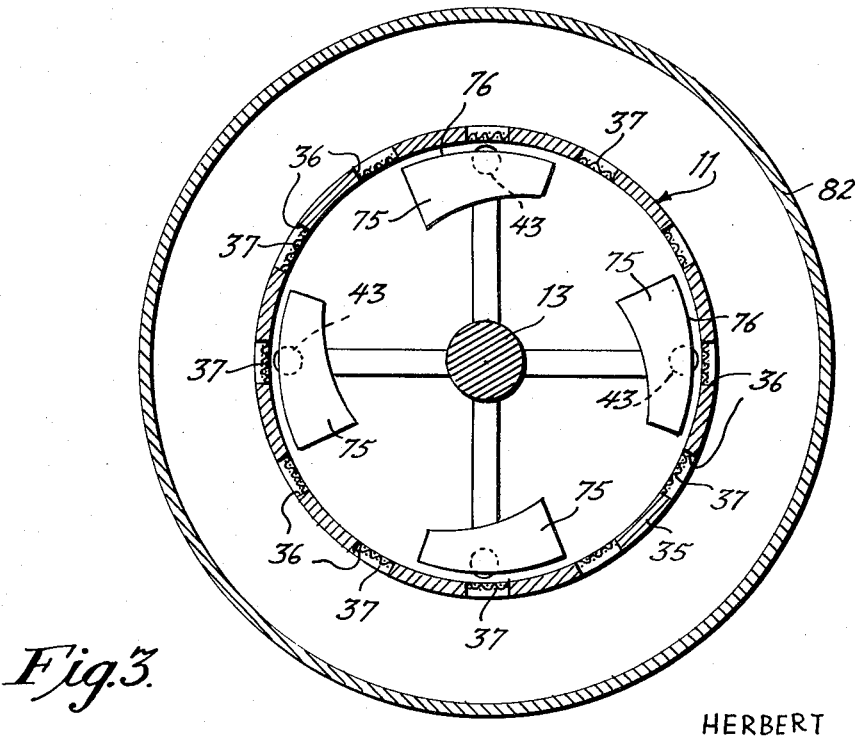
FIG. 3 is a transverse cross-sectional view taken generally along the line 3—3.

Formed in the shaft 12, in the end region 46, are a plurality of radially extending through openings, passageways or holes 50, each communicating between the hollow shaft interior 15, and a respective radial passageway 45, as best seen in FIGS. 1 and 2. By means of the aforedescribed structure, the drum 11 is axially rotatable together with the shaft 12. Further, a pulp material from which the liquid or fluid is to be extracted may be fed through coupling 30 and rotate shaft 12, from which the material passes by centrifugal force outwardly through holes 50 to the several passageways 45, and thence through openings 43 to the interior surface of the circumferential drum wall 35.

The cylindrical or circumferential drum wall 35, remote from end wall 40, may be open, and provided thereacross with a spider-like structure 52, which may be composed of a plurality of bars 53 each having one end secured, as by suitable fastener means 54 to the open end of circumferential drum wall 35, extending obliquely toward each other. A centrally open member or hub 55 may extend between and be fixedly secured, as by fasteners 56, to the proximate ends of spider members 53. The hub 55 is provided with a central through opening 57 coaxial with the drum 11 and shaft 12.

Thus, the circumferential wall 35 of the drum 11 has its end 58 remote from the end wall 40 open, except for the securement thereacross of spider 52, which does not appreciably impede the movement of material through the open drum end, for reasons appearing more fully hereinafter.

The additional shaft 13 is coaxial with the drum 11 and shaft 12, being rotatably journaled by pillow blocks 60 and 61 and carrying a transmission element 62, such as a toothed wheel, timing belt pulley or the like. The distal end region 63 of shaft 13, remote from the drum 11, extends through a stanchion or support 64, and is provided on its opposite end with a collar 65, fixedly secured to the shaft, as by threaded engagement thereon, or otherwise. A bearing assembly 66, such as a thrust resistant ball bearing, may be carried by the stanchion 64, surrounding the shaft region 63, and an abutment plate or ring 67 may be interposed between the antifriction bearing 66 and collar 65, thereby permitting free rotation of the shaft 13 while limiting shaft movement rightward.

In addition, the hub 55 is provided with an antifriction journal bearing 70 for rotative supporting engagement with the received region of shaft 13.

Further, shaft 13 extends inwardly through the open end 58 of drum 11, toward and terminates in a reduced end extension 71, adjacent to and spaced from the end extension 48 of shaft 12. An antifriction bearing 72 may have one element, say its outer race, suitably secured to the drum 11, as by an annular spacer 73 bolted or otherwise fastened to the inner wall 42. The inner race of the antifriction bearing 72 may rotatably support the end extension 71 of the shaft 13, so that the bearing defines a rotary joint connecting the shaft 13 to the drum 11 and shaft 12. By this construction, both the shafts 12 and 13 are mutually reinforced at their adjacent ends.

In addition to the structure described hereinbefore, there are provided a plurality of blades 75, each defining a segment of a spiral extending about the axis of drum 11, the blades being located in angularly spaced relation with respect to each other, having their outer peripheral edges 76 adjacent to but slightly spaced from the inner cylindrical surface of circumferential drum wall 35. Thus, there is clearance between the blades 76 and the filter elements or screens 37.

While there are illustrated four blades 76 arranged at 90° with respect to each other, it is appreciated that a greater or lesser number of blades may be employed, and that each of the blades may be of greater or lesser angular extent about the drum axis. The blades 75 may be suitably supported, as by arms 77 each extending radially from the shaft 13 to a respective blade, so that the blades are essentially fixed to the shaft 13 for rotation therewith. The blades 75 are suitably configured and rotatable relative to the drum 11 so as to effect conveyance therethrough toward the open drum end 58 in the manner of a screw conveyor or other suitable conveyor.

In operation, the pulp is centrifugally distributed to the interior of the drum 11 through passages 45, as described hereinbefore, being centrifugally urged radially outwardly against the interior surfaces of the drum wall 35 and the filter elements 37. The shaft 13 is rotatable relative to the shaft 12, so that the blades 75 rotate relative to the drum 11 and thereby effect conveyance of the pulp toward the open drum end 58 at a rate determined by the relative angular speed of shafts 12 and 13. The clearance between the blades 76 and filter elements 37 permits the pulp, or a loose filter medium to pack against the interior of the filter elements 37, and afford additional filtering effect, while permitting passage of filtered fluid or liquid radially outwardly through the holes 36 in the drum wall 35. Excess pulp, beyond that disposed in the cylindrical clearance space between blades 76 and drum 11, is conveyed leftward and exits through open drum end 58 for collection separately from the liquid.

In order to collect the filtered fluid or liquid, a fixed outer drum 80 is spacedly circumposed about the rotary drum 11, and provided with an outlet or drain 81. Separate from but adjacent to the fixed outer drum 80 is an additional fixed outer drum 82, which extends about the open end 58 of the drum 11 for receiving the discharged pulp. Suitable drain means 83 may be provided on the drum 82 for removing the pulp. Thus, the fluid extraction process may be continuous, the separated liquid and solids being removed continuously from the respective outer drums 80 and 82 by suitable means. If it is desired to afford the pulp additional time to pass a greater percentage of liquid through the filtering elements 37, the speed of rotation of drum 11 may be increased to produce greater centrifugal force; and/or the relative speed of rotation of the blades 76 with respect to the drum 11 may be reduced to lower the rate of leftward conveyance of pulp.

From the foregoing, it will be seen that the present invention provides a fluid extraction apparatus which is versatile in achieving various rates and percentages of fluid extraction, capable of operation with a wide variety of different types of pulp, is extremely simple in construction and operation, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. Apparatus for extracting fluids from pulp, said apparatus comprising an axially rotatable drum, a radial end wall closing one end of said drum and rotatable therewith, a central inlet in said one drum end wall for introducing pulp into the drum, radially extending passageways along said end wall communicating between said inlet and the circumferential wall of said drum for enhancing centrifugal action exerted on the pulp, said passageways terminating adjacent to said circumferential wall at spaced locations thereabout for radially displacing and circumferentially spreading the pulp, a centrally hollow shaft having one end fixed in fluid communication with said inlet and extending toward its other end away from said drum for passing pulp to said inlet, said shaft extending rigidly in axial alignment with said drum, journal means rotatably supporting said shaft to rotatably mount said drum, a sealing gland about said shaft for limiting pulp leakage, transmission means connected to said shaft to drive said shaft and drum, a filter element interposed in the circumferential wall of said drum for passing fluid filtered from said pulp to the exterior of the drum and retaining the remainder of the pulp, blade means in said drum adjacent to the filter element and disposed obliquely to guide said remainder toward the other drum end, said other drum end being open for discharge therethrough of remaining pulp, collection means exteriorly of said drum for collecting said fluid and pulp, an additional shaft extending coaxially of said drum into said open drum end, additional journal means supporting said additional shaft for axial rotation, said blade means extending from said additional shaft for rotation therewith, and additional transmission means connected to said additional shaft to drive the latter independently of said drum.

2. Apparatus according to claim 1, in combination with rotary joint means interposed between said first mentioned and additional shafts to mutually enhance their support.

* * * * *